(12) United States Patent
Tuteja et al.

(10) Patent No.: US 9,886,424 B2
(45) Date of Patent: Feb. 6, 2018

(54) WEB APPLICATION FRAMEWORK FOR EXTRACTING CONTENT

(71) Applicant: Wal-Mart Stores, Inc., Bentonville, AR (US)

(72) Inventors: Bhupesh Tuteja, San Jose, CA (US); Abhay Maruti Kamble, Cupertino, CA (US); Amit Khanchi, Foster City, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 483 days.

(21) Appl. No.: 14/015,792

(22) Filed: Aug. 30, 2013

(65) Prior Publication Data

US 2015/0067473 A1    Mar. 5, 2015

(51) Int. Cl.
| G06F 17/00 | (2006.01) |
| G06F 17/22 | (2006.01) |
| G06F 17/21 | (2006.01) |

(52) U.S. Cl.
CPC .......... *G06F 17/2247* (2013.01); *G06F 17/21* (2013.01)

(58) Field of Classification Search
CPC ............................. G06F 17/2247; G06F 17/21
See application file for complete search history.

(56) References Cited

U.S. PATENT DOCUMENTS

| 6,279,015 | B1* | 8/2001 | Fong ................. G06F 17/30607 715/239 |
| 6,499,052 | B1* | 12/2002 | Hoang .................... G06Q 30/06 705/26.5 |
| 7,076,766 | B2 | 7/2006 | Wirts |
| 7,165,073 | B2* | 1/2007 | Vandersluis ...... G06F 17/30389 |
| 7,188,216 | B1* | 3/2007 | Rajkumar ......... G06F 17/30902 707/E17.12 |
| 7,257,639 | B1* | 8/2007 | Li ........................... H04L 51/22 709/206 |
| 7,613,993 | B1* | 11/2009 | Baer ................... G06F 17/2229 707/999.001 |
| 7,849,437 | B2 | 12/2010 | Isaacs |
| 8,335,817 | B1 | 12/2012 | Dayan |
| 8,397,223 | B2 | 3/2013 | Chiang |
| 8,458,246 | B2 | 6/2013 | Guney |
| 8,458,612 | B2 | 6/2013 | Chatterjee |
| 8,671,417 | B2 | 3/2014 | Ickman |
| 8,683,357 | B2 | 3/2014 | Macken |
| 8,689,234 | B2 | 4/2014 | Macken |
| 2004/0254884 | A1 | 12/2004 | Haber |

(Continued)

*Primary Examiner* — Thu Huynh
(74) *Attorney, Agent, or Firm* — Bryan Cave LLP

(57) ABSTRACT

The present disclosure extends to methods, systems, and computer program products for a web application framework for extracting content. In some embodiments, a computer-implemented method of dynamically extracting context associated with a web request comprises, at a context analyzer layer, receiving a web request context, wherein the web request context comprises a coded expression. Some embodiments further comprise, at the context analyzer layer, invoking the context key of the context analyzer name class, determining that the context analyzer name class is not identified or if the value of the context key is not specified, and throwing an invalid configuration exception. Other embodiments of related methods and systems are also provided.

23 Claims, 8 Drawing Sheets

(56) References Cited

U.S. PATENT DOCUMENTS

| | | | |
|---|---|---|---|
| 2004/0267867 A1* | 12/2004 | Christian | H04L 29/06 709/200 |
| 2005/0091336 A1 | 4/2005 | DeHamer | |
| 2005/0251512 A1* | 11/2005 | McCauley | G06F 17/30023 |
| 2006/0026668 A1 | 2/2006 | Karoubi | |
| 2006/0041525 A1 | 2/2006 | Manfredi | |
| 2006/0294075 A1* | 12/2006 | Simic | G06F 17/30433 |
| 2007/0192715 A1* | 8/2007 | Kataria | G06Q 10/06 715/764 |
| 2009/0144612 A1* | 6/2009 | Ishii | G06F 9/4448 715/234 |
| 2011/0082749 A1* | 4/2011 | Rivlin | G06F 17/248 705/14.66 |
| 2011/0145735 A1* | 6/2011 | Driesner | G06Q 10/06 715/762 |
| 2011/0191407 A1 | 8/2011 | Fu | |
| 2011/0321010 A1 | 12/2011 | Wang | |
| 2012/0185911 A1 | 7/2012 | Polite | |
| 2013/0019314 A1 | 1/2013 | Ji | |
| 2013/0086020 A1 | 4/2013 | Addala | |
| 2013/0117657 A1* | 5/2013 | Verlaan | G06F 17/212 715/234 |
| 2014/0019847 A1 | 1/2014 | Osmak | |
| 2014/0082593 A1 | 3/2014 | Alper | |

\* cited by examiner

```
{
    "ID": "",
    "NAME": "",
    "TYPE": "",
    "DATAANALYZER":{
        "ID":"",
        "NAME":"",
        "TYPE":"WALMART:DATAANALYZER",
        "PROPERTIES":[
        ]
    },
    "DATASOURCE":   {
                    "ID": "",
                    "NAME" : "",
                    "TYPE" : "",
                    "ENDPOINT": "${TRENDSERVICE.ENDPOINT}/EMS-TS/TRENDS",
                    "METHOD": "POST",
                    "ACTIVE" : TRUE,
                    "PROPERTIES" : []
    },
    "RENDERER": "TRENDRENDERER",
        "PROPERTIES": {
        "SKIN": {
            "URL": "/IMG/COMMON/ADFP01.JPG",
            "ALT TEXT": "FURBY'S BACK"
        }
    },

"ACTIVE": TRUE,
    "COMPONENTS": [

```
                                          "DATASOURCE":{

"ENDPOINT":"$
{STORESERVICE.ENDPOINT}/STOREINFORMATIONBYID",

"ID":"FOO",

"NAME":"STOREINFORMATIONSERVICE",

"ACTIVE":TRUE,

"PROPERTIES":[],

"METHOD":"GET",
                                                     "PARAM":[
                                                          {

"NAME":"STOREID",

"TYPE":"PARAM",

"VALUE":"${CONTEXT.PREF_STORE.PREF_STORE}",

"REQUIRED":TRUE,

"OPTIONS":[]
                                                          },
                                                          {

"NAME":"ACCESSTOKEN",

"TYPE":"PARAM",

"VALUE":"123",

"REQUIRED":TRUE,

"OPTIONS":[]
                                                          },
```

*FIG. 5A*

```
{
    "NAME":"CLIENTID",
    "TYPE":"PARAM",
    "VALUE":"123",
    "REQUIRED":TRUE,
    "OPTIONS":[]
},
{
    "NAME":"DATAGROUP",
    "TYPE":"PARAM",
    "VALUE":"1,3",
    "REQUIRED":TRUE,
    "OPTIONS":[]
},
{
    "NAME":"DEBUG",
    "TYPE":"PARAM",
    "VALUE":"TRUE",
    "REQUIRED":TRUE,
    "OPTIONS":[]
}
    ]
 }
},
```

*FIG. 5B*

WEB APPLICATION FRAMEWORK FOR EXTRACTING CONTENT

RELATED U.S. APPLICATION

This application is related to U.S. application Ser. No. 14/015,819, filed Aug. 30, 2013. This application is also related to U.S. application Ser. No. 14/015,802, filed Aug. 30, 2013. The applications are incorporated herein by reference for all purposes.

BACKGROUND

Commonly, enterprise framework architecture may be used for organizing logic for business processes and information technology infrastructure, facilitating collaborative content creation, and operating as a framework upon which logic for business processes may be executed. Frameworks may allow many users to publish content from a central interface. Other frameworks manage and execute business logic processes and other technology infrastructure of an organization.

However, there presently does not exist a unified architecture having a common framework that can execute business logic as a service on a website while offering flexibility for numerous web-based applications.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 4 is a depiction of a component configuration according to an embodiment of the present disclosure;

FIGS. 5A and 5B are a depiction of component data source parameters according to an embodiment of the present disclosure;

Figure 1:
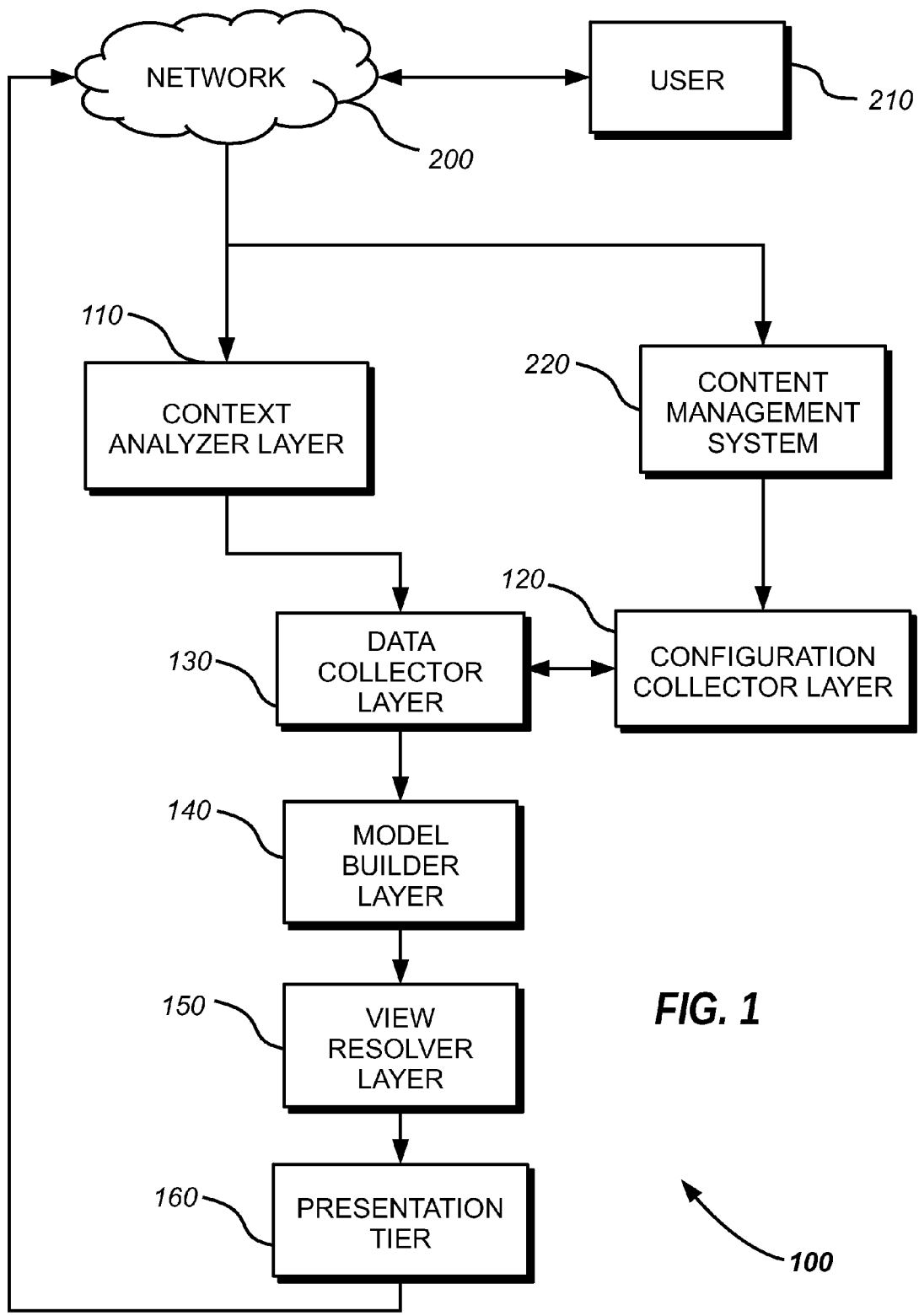
FIG. 1 is a block diagram illustrating components of a web application framework system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for executing a web application framework in one or more computer systems. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Embodiments of the present disclosure are directed to managing and executing a web application framework in one or more computing systems. According to embodiments disclosed herein, a web application framework may be implemented with a model-view-controller ("MVC") pattern having interfaces for a presentation tier and business tier used by the framework to integrate with an external content management system via a tree of components comprising container and content nodes, as will be described in further detail.

Referring now to FIG. 1, embodiments of web application framework system 100 of the present disclosure comprises context analyzer layer 110, configuration collector layer 120, data collector layer 130, model builder layer 140, view resolver layer 150, and presentation tier 160. Web application framework system 100, context analyzer layer 110, configuration collector layer 120, data collector layer 130, model builder layer 140, view resolver layer 150, and/or presentation tier 160 may be embodied in one or more computing devices that operate in an individual or distributed manner as will be described in detail below. In embodiments of the present disclosure, network 200 may include, but is not limited to, a wireless network, a cellular network, an intranet, the Internet, or combinations thereof.

Figure 2:
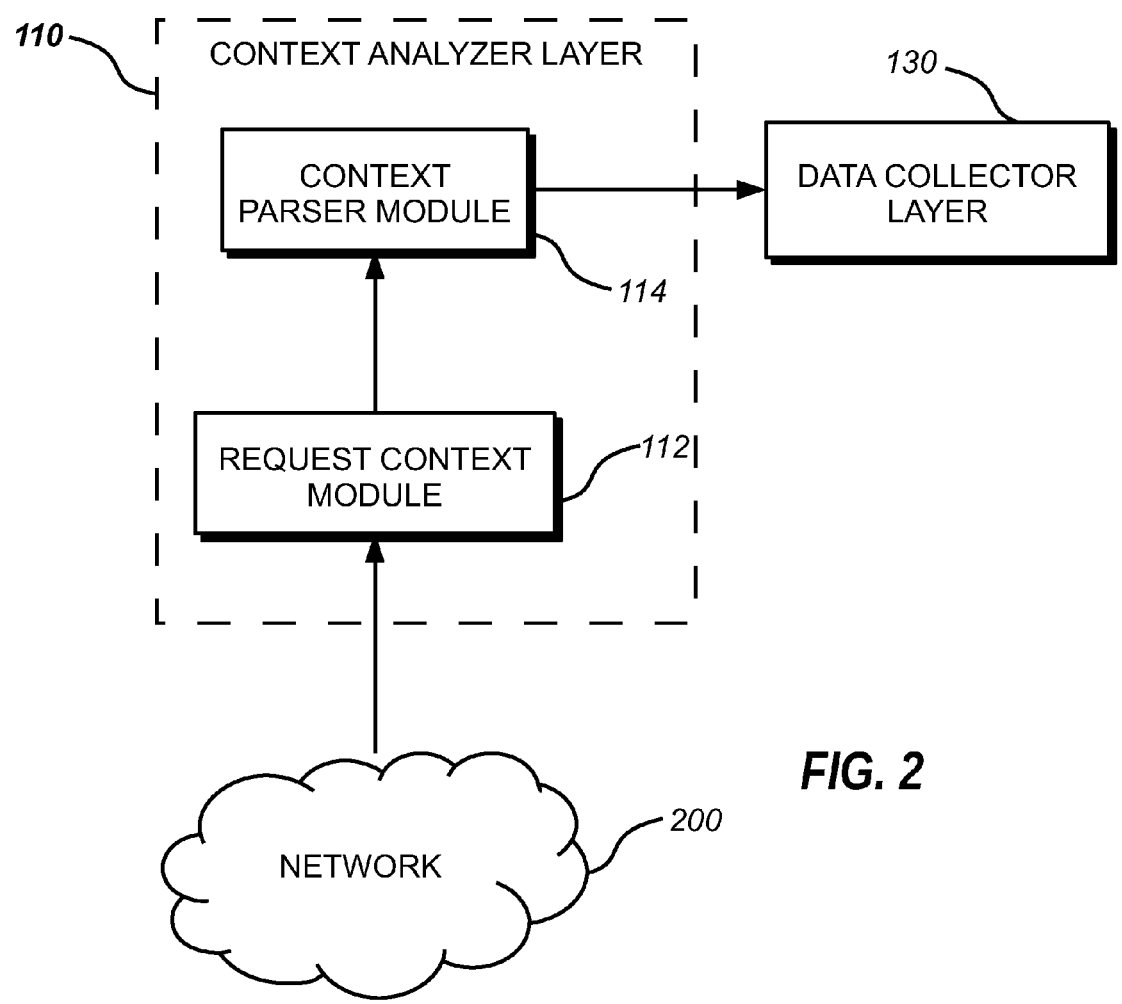
FIG. 2 is a block diagram illustrating a context analyzer layer according to an embodiment of the present disclosure.

Referring to FIG. 2, in embodiments, context analyzer layer 110 comprises request module 112 and context parser module 114. Request module 112 is adapted to receive context to a request from user computing device 210 via network 200. In embodiments, the request is a hypertext transfer protocol (HTTP) request generated at a user's computing device 210. Request context may include request parameters, cookies, request attributes, and the like. Request context module 112 can receive the request context and transmit the request context to context parser module 114. Context parser module 114 is adapted to parse the request context. The parsed request context may be transmitted to the data collector layer 130.

Figure 3:
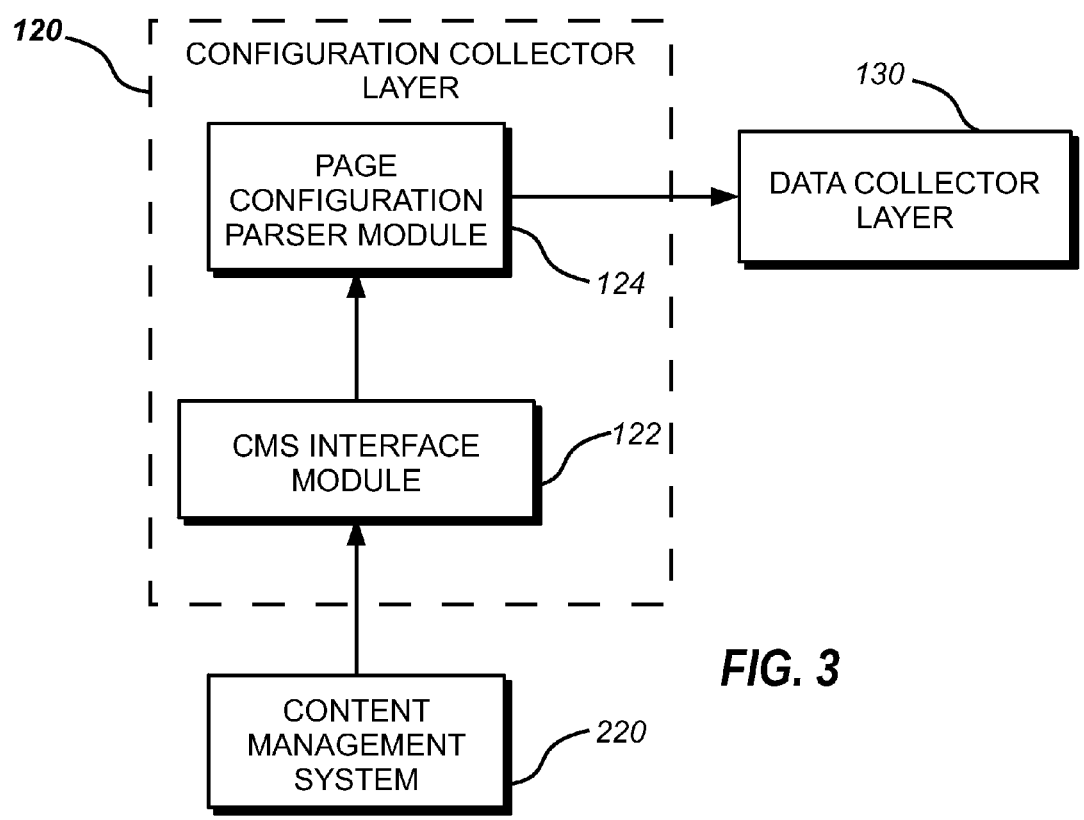
FIG. 3 is a block diagram illustrating a configuration collector layer according to an embodiment of the present disclosure.

Referring to FIG. 3, in embodiments, configuration collector layer 120 comprises CMS interface module 122 and page configuration parser module 124. CMS interface module 122 comprises an interface that may integrate with an external content management system 220. In embodiments, CMS interface module 122 may selectively interface with any number and/or type of CMS framework 220. According to embodiments, CMS interface module 122 can interface with a CMS framework 220 using JavaScript Object Notation ("JSON") over HTTP. In other embodiments, other languages and/or communication protocols may be employed.

CMS 220 may receive a request from a user computing device 210 via network 200. In response to such a request, CMS 220 can transmit a selected web page configuration to CMS interface module 122. The web page configuration may include a tree of components where a root component represents the web page template. In such a tree, leaf components may denote a module on the web page. Non-leaf components may represent a container used to group together one or more leaf components. Page configuration parser module 124 may parse the page components and pass the component configurations to data collector layer 130.

Referring now to FIG. 4, an example embodiment of a component configuration is depicted. According to embodiments of the present disclosure, each component may comprise certain attributes. For example, each component may have a "properties" attribute that may be used to pass configurable text, title, image URL, or other presentation-related configurable data from the CMS 220 and provide the flexibility to change such presentation-related data in a live environment without re-deploying the web application. As an additional example, each component may have a "data source" attribute to specify a service and/or source to invoke for fetching any data called for by the component. As an additional example, each component may have a "data analyzer" attribute to specify a decision point for the component, where a decision regarding an additional child component selection or other further processing may be called for.

Referring now to FIGS. 5A and 5B, an example embodiment of a component's optional data source parameters is depicted. In embodiments, a data source includes an endpoint and a method such as GET or POST. In some embodiments, a data source comprises input parameters. In other embodiments, a data source comprises no parameters. In embodiments, the endpoint itself does not include a query string if such is needed; for example similar to in a GET request. In such embodiments, input parameters may be inserted in a data source for the query string.

Figure 6:
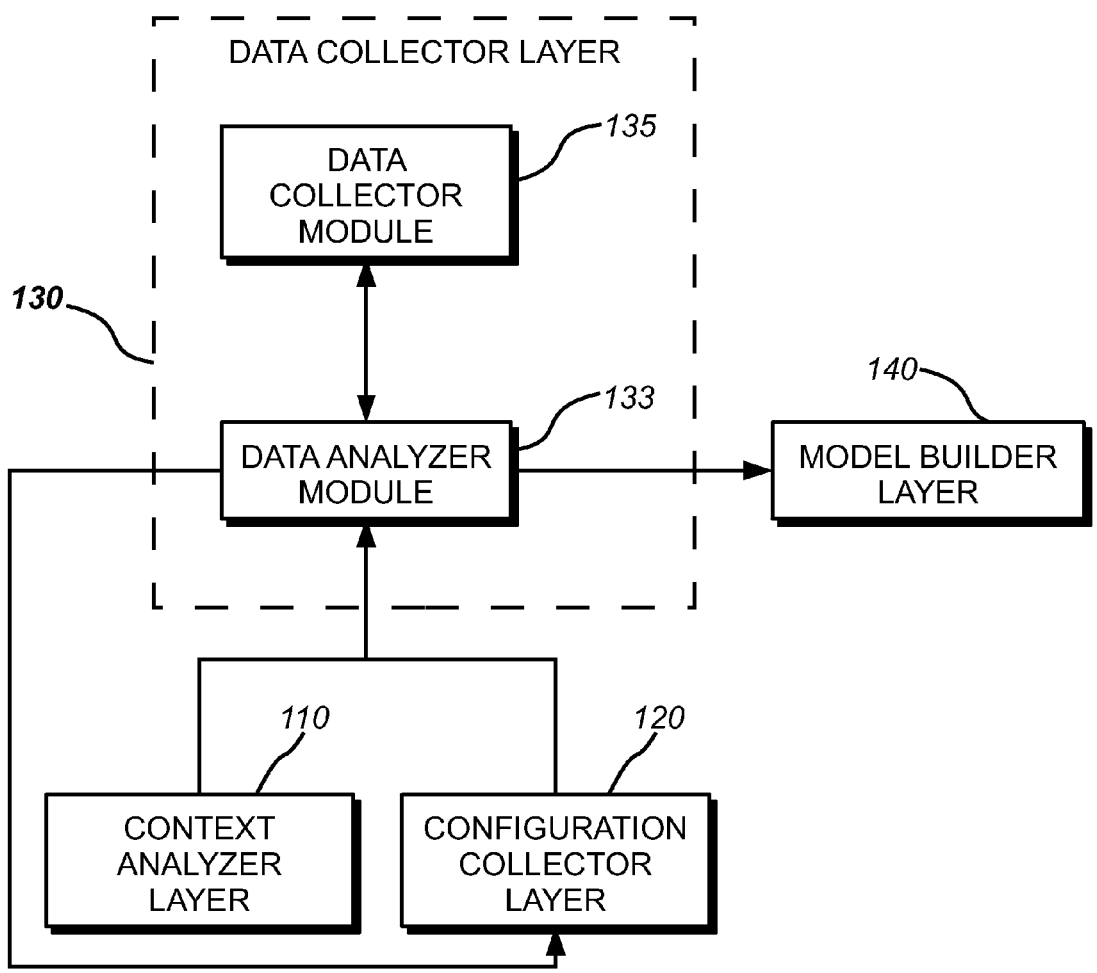
FIG. 6 is a block diagram illustrating a data collector layer according to an embodiment of the present disclosure.

Referring now to FIG. 6, data collector layer 130 comprises data analyzer module 133 and a data collector module 135. Data analyzer module 133 can receive request contexts from context analyzer layer 110, as called for at a data source call. Data analyzer module 133 can additionally receive components for the page from configuration collector layer 120. As additional decisions are called for by the data analyzer attribute of a component, data analyzer module 133 can process the requested decision, transmit a data request to data collector module 135, and return a selected child component resulting from that decision to configuration collection layer 120. In embodiments, data collector module 135 comprises a multi-threaded module. Data collector module 135 can optimize data call patterns by executing threads in parallel or sequential after analyzing inputs from configuration collector layer 120 and/or data analyzer module 133. Each thread may call an external service and retrieve data back for further processing Configuration collector layer 120 may then pass the configuration(s) for newly selected components back to data collector layer 130.

In alternative embodiments, the data analyzer configuration parameter of a component may specify a decision point for the component needed for child selection in the component tree for further processing and rendering. An external class can be implemented for decision-making and can be specified in the configuration of the component. The class may implement the data analyzer interface at data analyzer module 133. In operation, configuration collector layer 120 can load the class by reading its name from the component configuration and injecting it in the component. As a result, data collector layer 130 may execute it by using the data analyzer interface described above and any component calling for a decision point can have data analyzer defined as an attribute.

In operation, the data collector layer 130 may parse the full component tree for the page and extract data sources from each component for which data sources are defined. Embodiments of data analyzer module 133 can make data source calls for those components concurrently and may put the responses back against each component. If a component calls for a decision about a child selection in the current web page then that component may have a data analyzer attribute defined. If a data analyzer attribute is defined for a component, then data analyzer module 133 may withhold parsing that child component and may invoke the data sources of its children and wait until a final decision has been made for selection of child components. Data analyzer module 133 may then parse those selected children components and follow an iterative model of invoking concurrently the data sources of the sub-tree until a data analyzer is again identified on a component.

In alternative embodiments, data analyzer module 133 may also identify cases where one or more data sources were separately requested by different modules and then invoke any such data sources a single time (rather than multiple times) to provide results to the multiple components.

Figure 7:
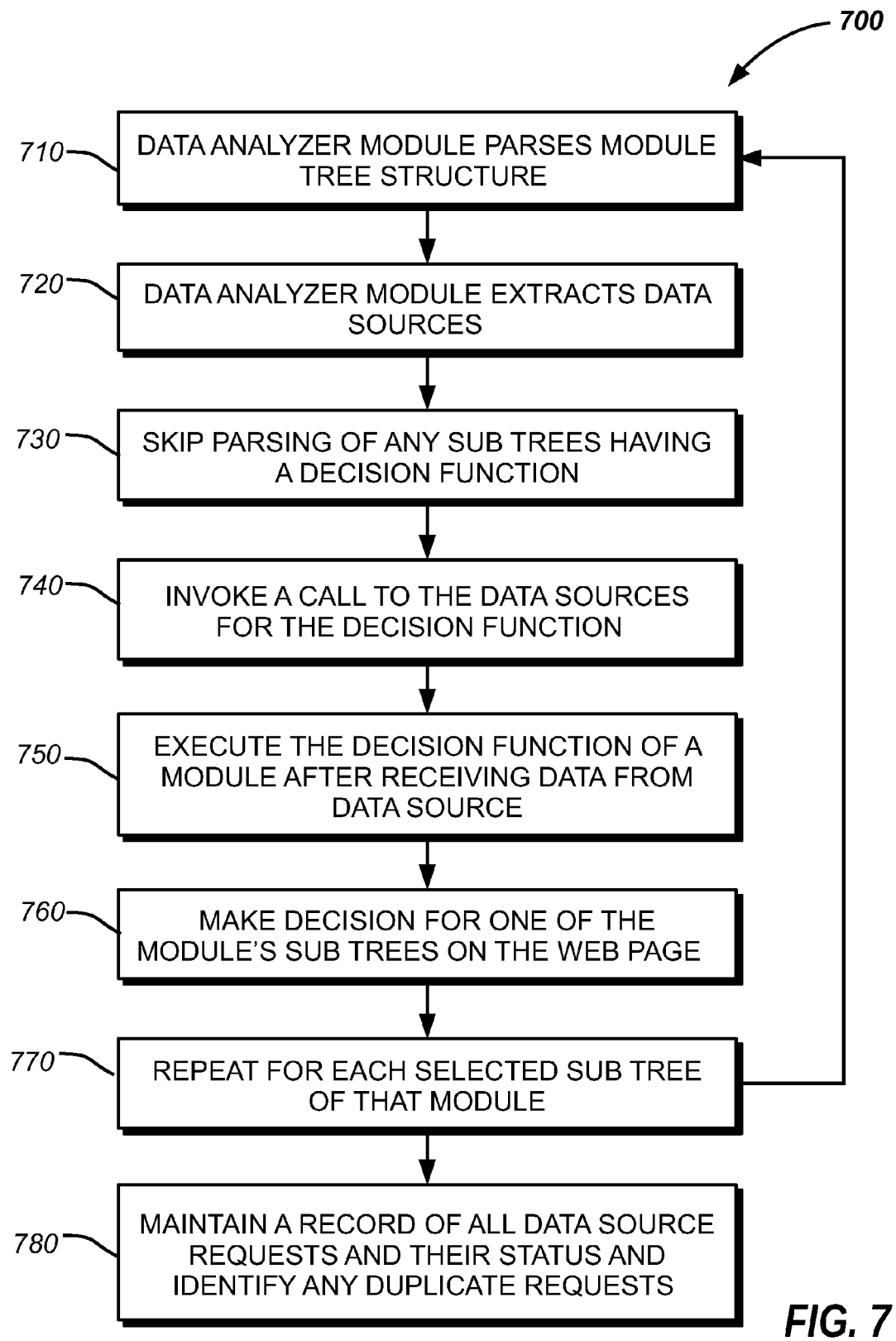
FIG. 7 is a chart illustrating an example method for parsing a web page definition containing a tree structure of modules in accordance with embodiments of the present disclosure.

Referring now to FIG. 7, a method 700 of parsing a web page definition containing a tree structure of modules according to embodiments of the present disclosure is illustrated. At operation 710, data analyzer module 133 parses a web page definition containing a tree structure of modules. At operation 720, data analyzer module 133 extracts data sources or references from those modules. At operation 730, data analyzer module 133 skips parsing of any sub-trees having a data analyzer (which data analyzer represents a decision function). In other words, as the data analyzer module 133 traverses the tree, it ignores any branches below a decision function. At operation 740, data analyzer module 133 invokes a call to the data sources or references for the data analyzer. At operation 750, data analyzer module 133 executes the data analyzer of a module after receiving data from data source or reference. At operation 760, a decision is made for one of the module's sub trees on the web page. At operation 770, the process is repeated on the selected sub tree of that module. At operation 780, data analyzer module 133 maintains a record of all data source requests and their status (i.e., whether the response is pending or received) and identifies any duplicate requests. Data analyzer may use such a record to reduce duplicate requests.

Referring now to FIG. 1, in embodiments, model builder layer 140 is adapted to prepare the model from the data for components by mapping the data to components in the component hierarchy for the web page. Model builder layer 140 can receive from data collector layer 130 page template and layout, including components passed to system 100 from CMS 220.

In embodiments, view resolver layer 150 is adapted to map the rendered names of the components to the views in presentation tier 160. In embodiments, presentation tier 160 is adapted to render the components by using the data and configuration provided by framework from the CMS and data source(s). Typically, rendered components may be constructed in an HTML file, cascading style sheets ("CSS") file, and/or other markup or style sheet files corresponding to the rendered page. Any such files may then be transmitted via network 200 back to user computing device 210 for display to the user.

Another embodiment of the present disclosure comprises extracting context from a request in a web application framework and dynamically transforming the request. In embodiments, the request may be made to an external data source or service. According to embodiments of the present disclosure, a data source definition can have a coded expression for the value of an input parameter. Context analyzer layer 110 can use the following types of expressions for endpoints as well as the value of an input parameter in a data source.

Context analyzer layer 110 can first try to find a property name matching the expression and will replace the expression with the value of the property, if found. The expression will not be altered yet if a property is not found. After property name, the following types will attempt be matched:

Request parameter. If the expression string starts with "request.param" then the context analyzer layer 110 can replace the expression with the value of the request parameter with "paramname", if found. It may be replaced with " " if not found.

Request cookie. If the expression string starts with "request.cookie" then the context analyzer layer 110 can attempt to identify a cookie in the request with the cookie name and use the value of the name to replace the expression. It may be replaced with " " if not found.

Request attribute. If the expression string starts with "request.attr" then the context analyzer layer 110 can replace the expression with the value of "attrName" attribute, if found. It may be replaced with " " if not found.

Request header. If the expression string starts with "request.header" then the context analyzer layer 110 can replace the expression with the value of "headerName" attribute, if found. It may be replaced with " " if not found.

Context Analyzer. If the expression string starts with "context" then the context analyzer layer 110 can try to find a contextAnalyzerName class and use the value of contextKey in the class to replace the above expression. Accordingly, it may be important that a context analyzer by that name is available. If the Context analyzer is not found or if contextKey is not specified, an invalid configuration exception can be thrown.

The aforementioned types of expressions may be used in combination inside a single endpoint or value of the input parameter of a data source. The aforementioned types of expressions may also be used repetitively for a single string value. In embodiments, if the value of an input parameter is null or blank after expression match and replacement (or for any other reason) and that input parameter is not marked as directed by the data source configuration, that input parameter may not be sent to the data source and may be ignored. However, if it is marked as "required" for the data source configuration, and is null or blank, a warning may be generated in the log and the data source may not be invoked. As a result, the data source may only be invoked when a request has all the expected input parameter values.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of dynamically extracting context associated with a web request, comprising:
   at a context analyzer layer, receiving a web request context, wherein the web request context comprises a coded expression;
   at the context analyzer layer, determining if the coded expression contains a property name of multiple property names;
   if the context analyzer layer determines the coded expression contains the property name of the multiple property names, updating the web request context at the context analyzer layer by replacing the coded expression with a value of the property name of the multiple property names;
   if the context analyzer layer determines the coded expression does not contain any property name of the multiple property names, updating the web request context by replacing at least a part of the coded expression by at least one of:
      at the context analyzer layer, determining that the coded expression starts with a request parameter attribute and replacing the at least the part of the coded expression with a value of a parameter name at the context analyzer layer;
      at the context analyzer layer, determining that the coded expression starts with a request cookie attribute and replacing the at least the part of the coded expression with a value of a cookie name at the context analyzer layer;
      at the context analyzer layer, determining that the coded expression starts with a request attribute and replacing the at least the part of the coded expression with a value of an attribute name at the context analyzer layer;
      at the context analyzer layer, determining that the coded expression starts with a request header attribute and replacing the at least the part of the coded expression with a value of a header name at the context analyzer layer; or
      at the context analyzer layer, determining that the coded expression starts with a context attribute and attempting to identify a context analyzer name class and replacing the at least the part of the coded expression with a value of a context key of the context analyzer name class at the context analyzer layer;
   at the context analyzer layer, determining if a value of the at least the part of the coded expression is null after replacing the at least the part of the coded expression;
   at the context analyzer layer, determining if the value of the at least the part of the coded expression is marked as required;
   if the value of the at least the part of the coded expression is (1) determined to be null and (2) not marked as required, then ignoring the value of the at least the part of the coded expression;
   if the value of the at least the part of the coded expression is (1) determined to be null and (2) marked as required, then, at the context analyzer layer, generating a warning in a log based at least in part on the determining that the value of the at least the part of the coded expression is null after replacing the at least the part of the coded expression;
   at the context analyzer layer, invoking the context key of the context analyzer name class; and
   at the context analyzer layer, determining that the context analyzer name class is not identified or that the value of the context key is not specified and then throwing an invalid configuration exception.

2. The method of claim 1, further comprising:
   at a data analyzer module, parsing a web page definition containing a plurality of modules in a tree structure;
   at the data analyzer module, extracting at least one of data sources or references from the plurality of modules in the tree structure;
   at the data analyzer module, skipping parsing of one or more sub-tree modules of the plurality of modules in the tree structure if the one or more sub-tree modules comprise a data analyzer representing a decision function;
   at the data analyzer module, invoking a call to the at least one of the data sources or the references of the plurality of modules in the tree structure for the data analyzer of the one or more sub-tree modules;
   at the data analyzer module, executing the data analyzer of the one or more sub-tree modules after receiving data from the at least one of the data sources or the references; and
   at the data analyzer module, making a decision for the one or more sub-tree modules.

3. The method of claim 2, further comprising:
   at the data analyzer module, receiving the web request context from the context analyzer layer.

4. The method of claim 1, further comprising:
   at a configuration collector layer, receiving a web page configuration.

5. The method of claim 4, further comprising:
   at the configuration collector layer, parsing the web page configuration into at least one page component, the at least one page component comprising one or more of (1) a properties attribute configured to pass configurable presentation-related data, (2) a data source attribute configured to specify a server or source to invoke for fetching additional data called for by the at least one page component, or (3) a data analyzer configured to specify a decision point for the at least one page component when an additional decision regarding an additional child page component is called for; and
   changing the configurable presentation-related data in a live environment without re-deploying a web application associated with the web request context.

6. The method of claim 1, further comprising:
   at a data collector layer, parsing a page component; and
   at the data collector layer, invoking a data source call corresponding to the page component.

7. The method of claim 1, further comprising:
   at a model builder layer, preparing a page model;
   at a view resolver layer, mapping between a view name of a page component and a view in a presentation tier; and
   at the presentation tier, rendering the page component.

8. The method of claim 1, further comprising:
   at a data analyzer module, parsing a web page definition containing a tree structure of modules;

at the data analyzer module, receiving the web request context from the context analyzer layer;
at a configuration collector layer, receiving a web page configuration;
at the configuration collector layer, parsing the web page configuration into at least one page component;
at a data collector layer, parsing a page component;
at the data collector layer, invoking a data source call corresponding to the page component;
at a model builder layer, preparing a page model;
at a view resolver layer, mapping between a view name of the page component and a view in a presentation tier; and
at the presentation tier, rendering the page component.

9. A web application framework system, comprising:
a computer system comprising:
non-transitory memory; and
a context analyzer layer comprising:
a request context module configured to be operable at the computer system and receive a web request context; and a context parser module;
wherein the context parser module is configured to:
be operable at the computer system;
receive the web request context, wherein the web request context comprises a coded expression;
determine if the coded expression contains a property name of multiple property names;
if the coded expression contains the property name of the multiple property names, update the web request context by replacing the coded expression with a value of the property name of the multiple property names;
if the coded expression does not contain any property name of the multiple property names, update the web request context by replacing at least a part of the coded expression by at least one of:
determining that the coded expression starts with a request parameter attribute, and replacing the at least the part of the coded expression with a value of a parameter name at the context analyzer layer;
determining that the coded expression starts with a request cookie attribute and replacing the at least the part of the coded expression with a value of a cookie name at the context analyzer layer;
determining that the coded expression starts with a request attribute and replacing the at least the part of the coded expression with a value of an attribute name at the context analyzer layer; or
determining that the coded expression starts with a request header attribute and replacing the at least the part of the coded expression with a value of a header name at the context analyzer layer;
determine that if a value of the at least the part of the coded expression is null after replacing the at least the part of the coded expression;
determine if the value of the at least the part of the coded expression is marked as required;
if the value of the at least the part of the coded expression is (1) determined to be null and (2) not marked as required, then ignore the value of the at least the part of the coded expression;
if the value of the at least the part of the coded expression is (1) determined to be null and (2) marked as required, then generate a warning in a log based at least in part on the value of the at least the part of the coded expression is null after replacing the at least the part of the coded expression;
determine that the coded expression starts with a context attribute, and attempt to identify a context analyzer name class and replace the at least the part of the coded expression with a value of a context key of the context analyzer name class at the context analyzer layer; and
determine that the context analyzer name class is not identified or that the value of the context key is not specified, and then throw an invalid configuration exception.

10. The web application framework system of claim 9, further comprising a configuration collector layer adapted to:
interface with a CMS framework; and
parse a page component and pass a page configuration to a data collector layer, the page component comprising one or more of (1) a properties attribute configured to pass configurable presentation-related data, (2) a data source attribute configured to specify a server or source to invoke for fetching additional data called for by the page component, or (3) a data analyzer configured to specify a decision point for the page component when an additional decision regarding an additional child page component is called for; and
changing the configurable presentation-related data in a live environment without re-deploying a web application associated with the web request context.

11. The web application framework system of claim 9, further comprising a data collector layer comprising:
a data analyzer module configured to:
be operable at the computer system;
process a requested decision;
parse a web page definition containing a plurality of modules in a tree structure;
extract at least one of data sources or references from the plurality of modules in the tree structure;
skip parsing of one or more sub-tree modules of the plurality of modules in the tree structure if the one or more sub-tree modules comprise a data analyzer representing a decision function;
invoke a call to the at least one of the data sources or the references of the plurality of modules in the tree structure for the data analyzer of the one or more sub-tree modules;
execute the data analyzer of the one or more sub-tree modules after receiving data from the at least one of the data sources or the references; and
make a decision for the one or more sub-tree modules; and
a data collector module configured to be operable at the computer system.

12. The web application framework system of claim 11, further comprising a model builder layer adapted to prepare a model from data received from the data collector module and from a page component.

13. The web application framework system of claim 9, further comprising a presentation tier adapted to render a page file and transmit the page file for display at a user computing device.

14. The web application framework system of claim 9, further comprising:

a configuration collector layer adapted to interface with a CMS framework, and parse a page component and pass a page configuration to a data collector layer;

a data collector layer comprising:
 a data analyzer module configured to be operable at the computer system and adapted to process a requested decision; and
 a data collector module configured to be operable at the computer system;

a model builder layer adapted to prepare a model from data received from the data collector module and from the page component; and a presentation tier adapted to render a page file and transmit the page file for display at a user computing device.

15. A computer-implemented method of dynamically extracting context associated with a web request, comprising:

at a context analyzer layer, receiving a web request context, wherein the web request context comprises a coded expression;

at the context analyzer layer, determining if the coded expression contains a property name of multiple property names;

if the context analyzer layer determines the coded expression contains the property name of the multiple property names, updating the web request context at the context analyzer layer by replacing the coded expression with a value of the property name of the multiple property names;

if the context analyzer layer determines the coded expression does not contain any property name of the multiple property names, updating the web request context by replacing at least a part of the coded expression by at least one of:
 determining that the coded expression starts with a request parameter attribute, and replacing the at least the part of the coded expression with a value of a parameter name at the context analyzer layer;
 determining that the coded expression starts with a request cookie attribute, and replacing the at least the part of the coded expression with a value of a cookie name at the context analyzer layer;
 determining that the coded expression starts with a request attribute, and replacing the at least the part of the coded expression with a value of an attribute name at the context analyzer layer;
 determining that the coded expression starts with a request header attribute, and replacing the at least the part of the coded expression with a value of a header name at the context analyzer layer; or
 determining that the coded expression starts with a context attribute, and attempting to identify a context analyzer name class and replacing the at least the part of the coded expression with a value of a context key of the context analyzer name class at the context analyzer layer; and at the context analyzer layer:
 determining if a value of the at least the part of the coded expression is null after replacing the at least the part of the coded expression;
 determining if the value of the at least the part of the coded expression is marked as required;
 if the value of the at least the part of the coded expression is (1) determined to be null and (2) marked as not required, then ignoring the value of the at least the part of the coded expression;
 if the value of the at least the part of the coded expression is (1) determined to be null and (2) marked as required, then generating a warning in a log based at least in part on the determining that the value of the at least the part of the coded expression is null after replacing the at least the part of the coded expression;
 invoking the context key of the context analyzer name class; and
 determining that the context analyzer name class is not identified or that the value of the context key is not specified, and then throwing an invalid configuration exception.

16. The computer-implemented method of claim 15, further comprising:
 at a data analyzer module, parsing a web page definition containing a plurality of modules in a tree structure;
 at the data analyzer module, extracting at least one of data sources or references from the plurality of modules in the tree structure;
 at the data analyzer module, skipping parsing of one or more sub-tree modules of the plurality of modules in the tree structure if the one or more sub-tree modules comprise a data analyzer representing a decision function;
 at the data analyzer module, invoking a call to the at least one of the data sources or the references of the plurality of modules in the tree structure for the data analyzer of the one or more sub-tree modules;
 at the data analyzer module, executing the data analyzer of the one or more sub-tree modules after receiving data from the at least one of the data sources or the references; and
 at the data analyzer module, making a decision for the one or more sub-tree modules.

17. The computer-implemented method of claim 16, further comprising:
 at the data analyzer module, receiving the web request context from the context analyzer layer.

18. The computer-implemented method of claim 15, further comprising:
 at a configuration collector layer, receiving a web page configuration.

19. The computer-implemented method of claim 18, further comprising:
 at the configuration collector layer, parsing the web page configuration into at least one page component, the at least one page component comprising one or more of (1) a properties attribute configured to pass configurable presentation-related data, (2) a data source attribute configured to specify a server or source to invoke for fetching additional data called for by the at least one page component, or (3) a data analyzer configured to specify a decision point for the at least one page component when an additional decision regarding an additional child page component is called for; and
 changing the configurable presentation-related data in a live environment without re-deploying a web application associated with the web request context.

20. The computer-implemented method of claim 15, further comprising:
 at a data collector layer:
  parsing a page component; and
  invoking a data source call corresponding to the page component.

21. The computer-implemented method of claim 15, further comprising:
   at a model builder layer preparing a page model.

22. The computer-implemented method of claim 15, further comprising:
   at a view resolver layer mapping between a view name of a page component and a view in a presentation tier.

23. The computer-implemented method of claim 15, further comprising:
   at a data analyzer module parsing a web page definition containing a tree structure of modules;
   at the data analyzer module receiving the web request context from the context analyzer layer;
   at a configuration collector layer receiving a web page configuration;
   at the configuration collector layer parsing the web page configuration into at least one page component;
   at a data collector layer:
      parsing a page component; and
      invoking a data source call corresponding to the page component;
   at a model builder layer preparing a page model; and
   at a view resolver layer mapping between a view name of the page component and a view in a presentation tier.

* * * * *